United States Patent [19]

Dakin et al.

[11] 4,347,619

[45] Aug. 31, 1982

[54] DIGITAL FORMATTING SYSTEM

[75] Inventors: Wayne R. Dakin, Huntington Beach, Calif.; Jordan Isailovic, Belgrade, Yugoslavia

[73] Assignee: Discovision Associates, Costa Mesa, Calif.

[21] Appl. No.: 218,584

[22] Filed: Dec. 19, 1980

[51] Int. Cl.³ .................... H04N 9/36; H04L 25/49
[52] U.S. Cl. ........................ 375/37; 375/17; 358/141; 371/56
[58] Field of Search ........... 375/25, 34, 37, 17; 455/61; 358/4, 7, 11–15, 17, 23, 142, 143, 145, 141; 360/32, 33; 343/703; 371/55, 56

[56] References Cited

U.S. PATENT DOCUMENTS

| Re. 30,182 | 12/1979 | Howson | 375/37 |
|---|---|---|---|
| 2,995,620 | 8/1961 | Burr | 358/11 |
| 3,889,288 | 6/1975 | Rennick | 358/11 |
| 3,968,513 | 7/1976 | De Haan | 358/4 |
| 3,973,079 | 8/1976 | Fukinuki et al. | 375/37 |
| 4,068,258 | 1/1978 | Bied-Charreton | 358/15 |
| 4,303,912 | 12/1981 | Stafford et al. | 358/13 |

Primary Examiner—Benedict V. Safourek
Assistant Examiner—Stephen Chin
Attorney, Agent, or Firm—Ronald J. Clark

[57] ABSTRACT

An improved method and apparatus for transforming digital information into a special format similar to that of a standard color video signal. The special format includes a multi-level baseband component corresponding to the luminance component of a standard video signal, and a phase and/or amplitude-modulated subcarrier corresponding to the chrominance component of a video signal. This format is highly efficient and takes better advantage of high signal-to-noise ratio channels, and the signal can be transmitted over standard video channels and conventional video circuitry can be used to process it.

27 Claims, 7 Drawing Figures

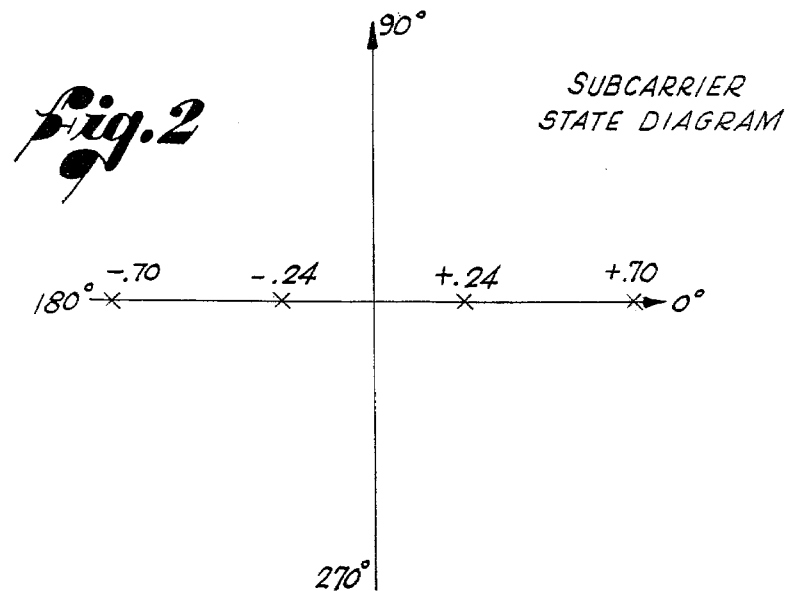
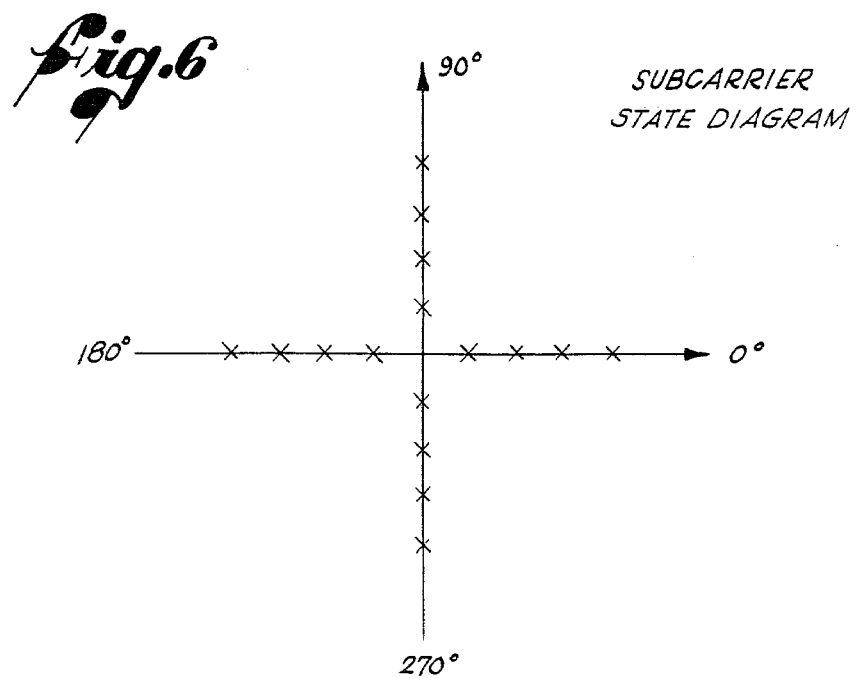

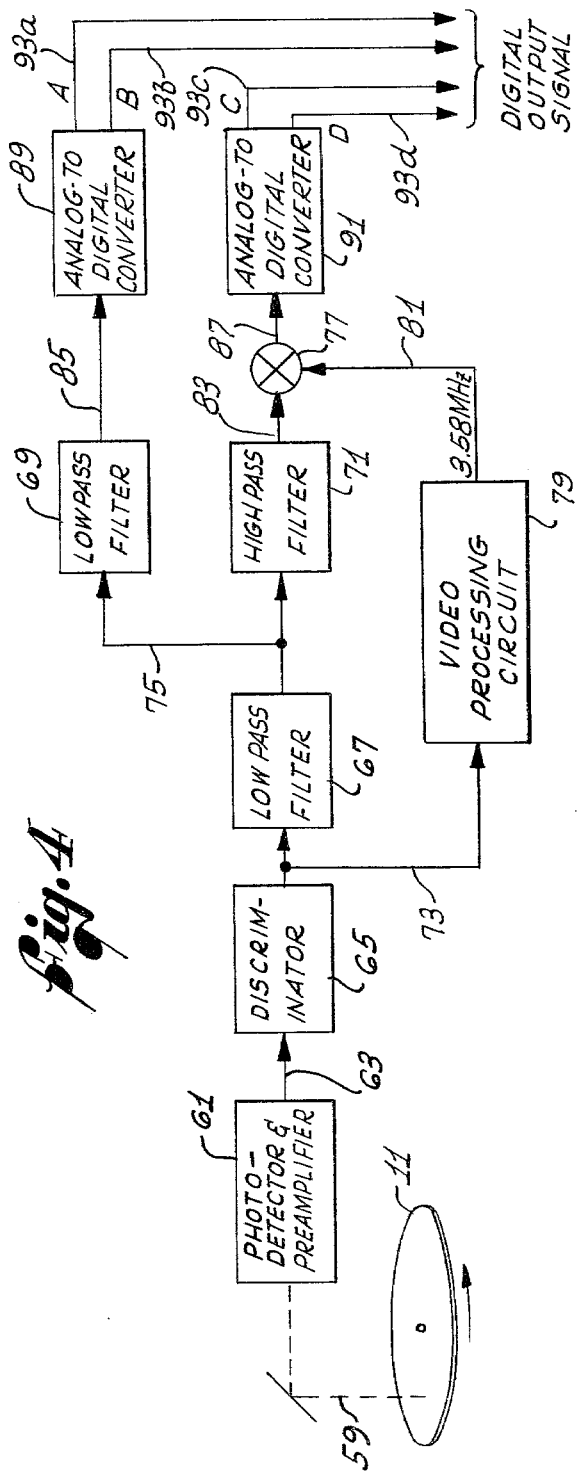
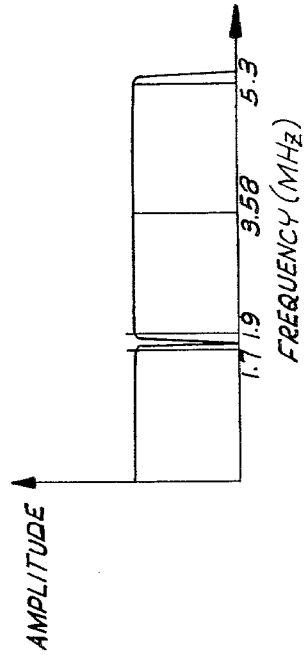

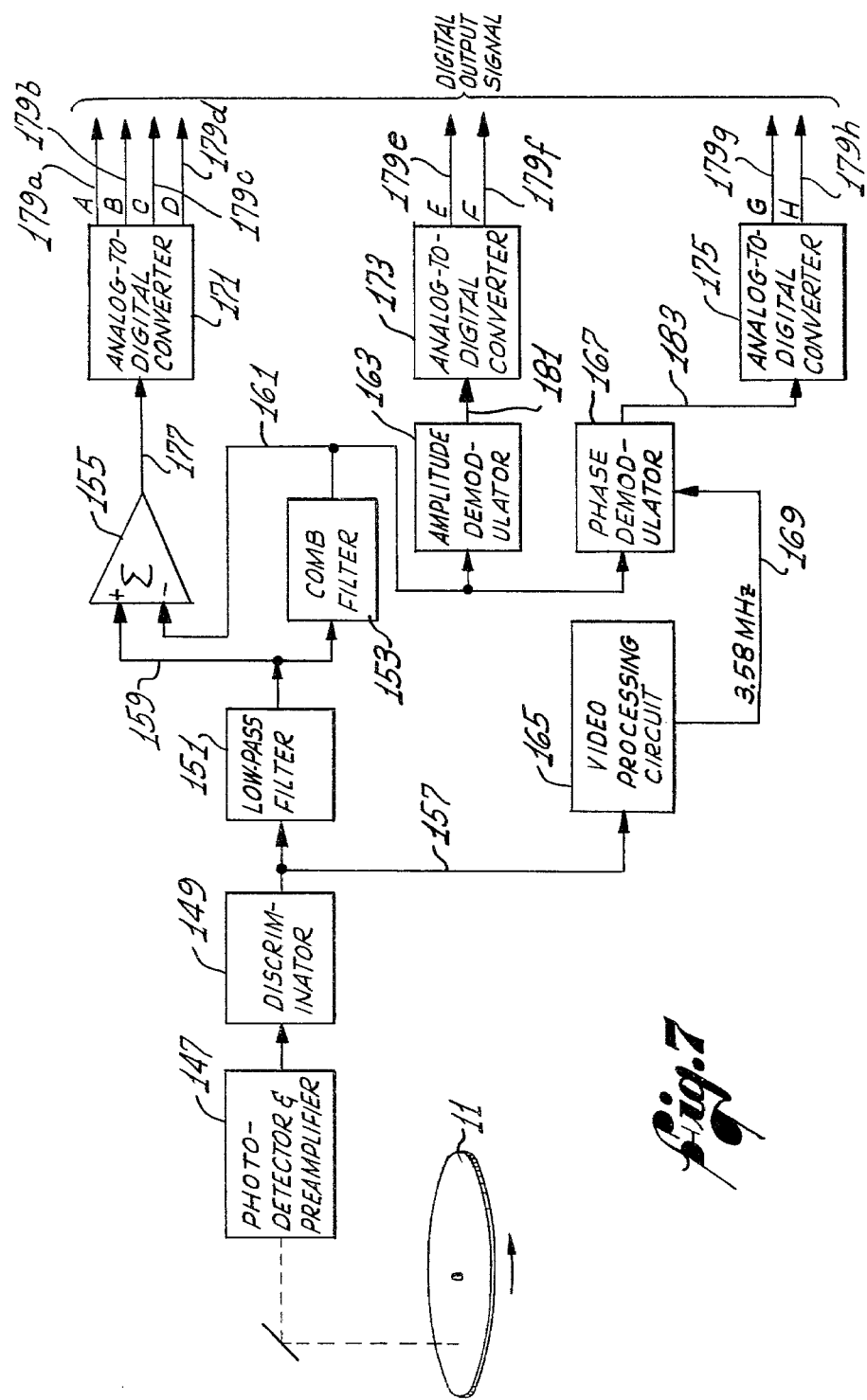

DIGITAL FORMATTING SYSTEM

BACKGROUND OF THE INVENTION

This invention relates generally to systems for formattting digital information, and more particularly, to methods and apparatus for transforming digital information into a format similar to that of a standard color video signal, for subsequent processing by conventional video circuitry.

Systems of this general type are of particular use in recording digital information on a record medium such as a video disc. One such system is described in a copending and commonly-assigned application for U.S. Patent, Ser. No. 66,620, filed Aug. 15, 1979 in the name of W. R. Dakin and entitled "Video Recording Medium for Sto-Motion Playback". In the disclosed system, discrete segments of an analog audio signal are digitized and compressed in time, and recorded as baseband signals on alternate tracks of a video disc. Corresponding frames of a conventional video signal are recorded as fequency-modulated carrier signals on the tracks interleaved with the audio tracks. During playback of the disc, a selected audio track is scanned initially, to recover the recorded digital audio data, and the recovered data is entered into a memory. The track recording the corresponding video frame is then scanned in a repeated fashion, to produce a stop-motion display of the frame, while the stored audio data is extracted from the memory and converted back to an analog format, for simultaneous playback at its original speed.

In the aforedescribed system, the audio information is recorded as a baseband digital signal, whereas the video signal is recorded as a frequency-modulated carrier. Although this signal formattting technique is effective in processing both video and audio information, it has not proven entirely satisfactory, primarily because the frequency spectra of the respective video and audio signals are substantially different and because the audio signal sometimes cannot be transmitted over a standard color video channel.

It thus will be apparent that a need has existed for a digital formatting technique in which digital information is converted into a format similar to that of a conventional color video signal. Also, it will be apparent that a need has existed for a digital formatting technique that takes better advantage of a relatively high signal-to-noise ratio channel such as a recording medium, to record more information in a prescribed bandwidth. The present invention fulfills these needs.

SUMMARY OF THE INVENTION

The present invention is embodied in an apparatus and related method for formatting digital information into a special format similar to that of a conventional color video signal. In accordance with the invention, the digital information is first arranged into first and second multi-level signals, each signal having at least two signal states, after which a subcarrier is modulated in accordance with the second multi-level signal. The modulated subcarrier signal and the first multi-level signal are then summed with conventional video synchronization signals, to produce a composite signal having a format similar to that of a conventional video signal. The composite signal can thereafter be transmitted over a standard color video channel, thereby reducing the complexity of systems such as video recorders that can process both digital and video information.

The subcarrier modulated by the second multi-level signal preferably has a frequency corresponding to that of the chrominance subcarrier of a standard video signal (i.e., about 3.58 MHz in an NTSC system). Also, the bandwidths of the two multi-level signals are preferably substantially the same, with the first multi-level signal extending to about 1.7 MHz and the modulated subcarrier signal having a lower sideband extending to about 1.9 MHz. In an alternative embodiment, the bandwidths of the first multi-level signal and the modulated subcarrier are greater so that they overlap each other, but do so in an interleaved fashion so that they can thereafter be separated from each other using a conventional comb filter.

In the preferred embodiments, both multi-level signals have more than two signal states. Also, each signal is generated by a digital-to-analog (D/A) converter responsive to a plurality of binary input signals, and the conversion is performed in accordance with a Gray code. The modulated subcarrier signal is modulated in either amplitude, phase angle, or both, and each modulation state corresponds to a different level in the second multi-level signal. The digital information represented by the plurality of binary signals supplied to the two D/A converters is thereby transformed into a format that makes efficient usage of available bandwidth, and takes better advantage of a high signal-to-noise ratio channel, such as a video recording/playback system.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 2 is a state diagram of a modulated subcarrier signal included in the specially-formatted digital signal recorded by the apparatus of FIG. 1;

FIG. 3 is a graph showing the frequency spectrum of the specially-formatted digital signal recorded by the apparatus of FIG. 1;

FIG. 4 is a simplified block diagram of apparatus for recovering the specially-formatted digital signal from the video disc of FIG. 1, and for returning it to its original digital format;

FIG. 6 is a state diagram of a modulated subcarrier signal included in the specially-formatted digital signal recorded by the apparatus of FIG. 5; and FIG. 7 is a simplified block diagram of apparatus for recovering the specially-formatted digital signal from the video disc of FIG. 5, and for returning it to its original digital format.

DESCRIPTION OF THE PREFERRED EMBODIMENTS

Figure 1:
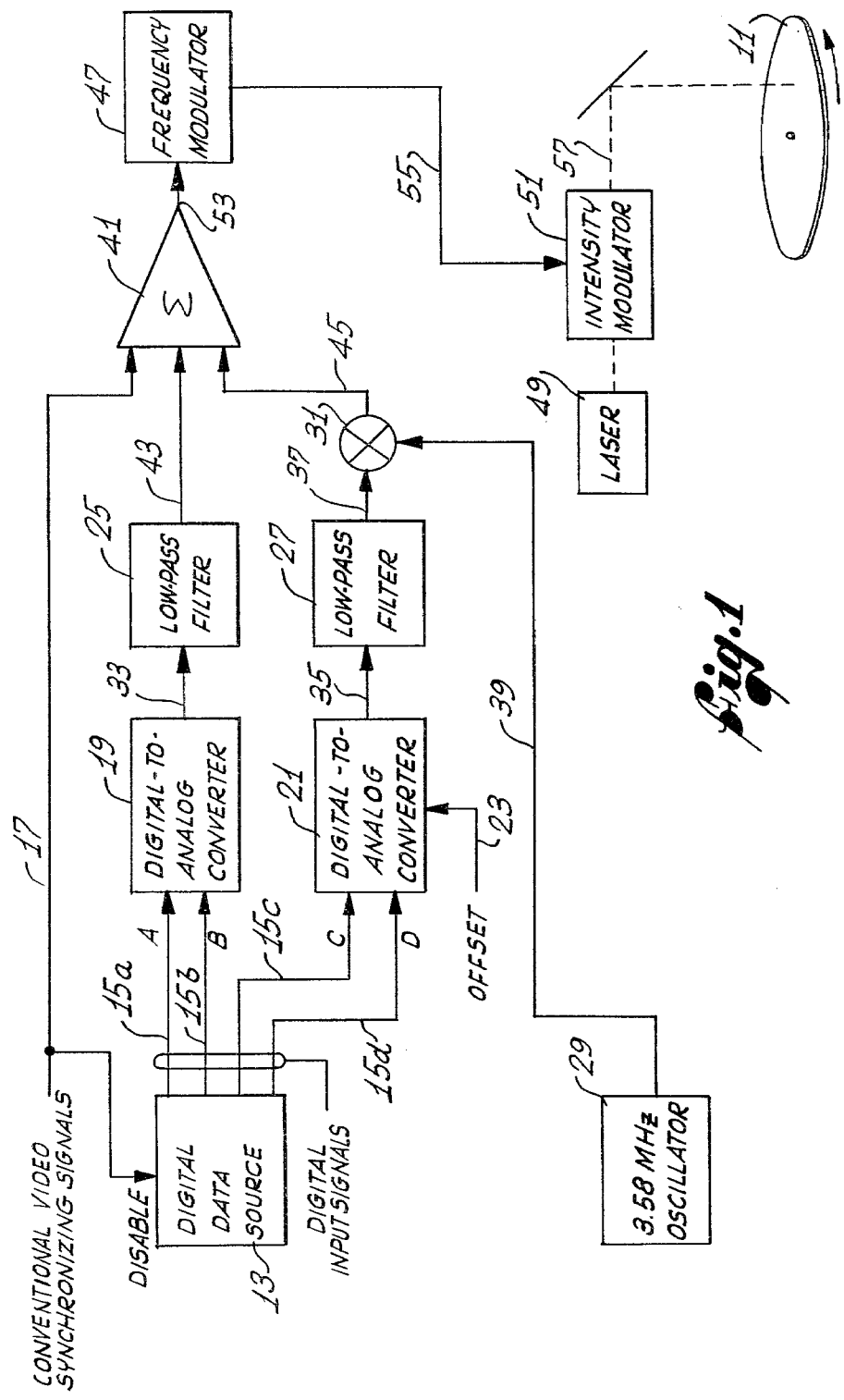
FIG. 1 is a simplifeid block diagram of apparatus in accordance with the invention for formattting digital information into a special signal having a video-like format, and for recording the formatted information on a video disc.

Referring now to the drawings, and particularly to FIG. 1, there is shown apparatus for formatting digital data into a special composite signal similar to that of a conventional color video signal, and for recording the composite signal on a video disc 11. The special composite signal includes a baseband signal component analogous to luminance portion of a video signal, and a modulated subcarrier signal component analogous to the chrominance portion of a video signal. The frequency of the subcarrier is preferably 3.58 MHz, the same as a standard NTSC chrominance subcarrier. The two signal components are interleaved with conventional video synchronization signal, so the composite signal has the appearance of a standard color video signal and can be transmitted over standard color video channels. Also, the special composite signal utilizes the available video bandwidth with high efficiency, and thus takes advantage of the relatively high signal-to-noise ratio ordinarily available in video disc recording.

More particularly, the digital data is stored initially in a digital data source 13 such as a digital memory. It is appropriately connected to output a succession of four-bit digital words on lines 15a through 15d at a rate of 1.8 MHz, except when it is disabled by conventional video synchronizing signals supplied on line 17. The data is thereby output only during the time intervals ordinarily occupied by conventional luminance and chrominance components of a video signal.

The apparatus of FIG. 1 further includes first and second digital-to-analog (D/A) converters 19 and 21, respectively, for converting the sequence of four-bit words output by the digital data source 13 into first and second four-level analog signals. The first two bits (i.e., bits A and B) in the successive four-bit words are coupled over lines 15a and 15b to the first D/A converter, and the second two bits (i.e., bits C and D) are coupled over lines 15c and 15d to the second D/A converter. The two four-level signals change states simultaneously, at a rate of 1.8 MHz. The second four-level signal is offset by a fixed offset level supplied to the second D/A converter on line 23, whereby two of the four states are greater than zero and the other two states are less than zero. This facilitates a subsequent phase and amplitude modulation of the subcarrier signal.

The four distinct states of the first and the second four-level signals are shown in Tables I and II, respectively. It will be observed that the four states in each signal are equally-spaced with respect to each other, so as to maximize the immunity of the system to noise. It will also be observed that the states are assigned according to a conventional Gray code, so that noise-induced errors are ordinarily result in only one bit error being made.

TABLE I

| Bit A | Bit B | Relative Amplitude of First Four-Level Signal |
|---|---|---|
| 0 | 0 | 15 |
| 0 | 1 | 38.3 |
| 1 | 1 | 61.7 |
| 1 | 0 | 85 |

TABLE II

| Bit C | Bit D | Relative Amplitude of Second Four-Level Signals | Relative Amplitude of Modulated Subcarrier | Phase Angle of Subcarrier |
|---|---|---|---|---|
| 0 | 0 | 70 | 70 | 0° |
| 0 | 1 | 24 | 24 | 0° |
| 1 | 1 | −24 | 24 | 180° |

TABLE II-continued

| Bit C | Bit D | Relative Amplitude of Second Four-Level Signals | Relative Amplitude of Modulated Subcarrier | Phase Angle of Subcarrier |
|---|---|---|---|---|
| 1 | 0 | −70 | 70 | 180° |

The apparatus of FIG. 1 further includes first and second 1.7 MHz low pass filters 25 and 27, respectively, for filtering the respective first and second four-level signals, an oscillator 29 for generating a 3.58 MHz subcarrier signal, and a multiplier or mixer 31 for modulating the subcarrier signal in accordance with the second four-level signal. More particularly, the first four-level signal is transmitted over line 33 from the first D/A converter 19 to the first low-pass filter, and the second four-level signal is transmitted over line 35 from the second D/A converter 21 to the second low-pass filter. The bandwidths of the two signals are thereby limited to about 1.7 MHz. The filtered second four-level signal is transmitted over line 37 to the mixer, which modulates, accordingly, the amplitude and phase angle of the subcarrier signal, supplied on line 39 from the oscillator.

The first four-level signal is subsequently amplified such that it ranges in amplitude between 15 and 85 I.R.E., and the subcarrier signal is subsequently amplified such that it ranges in amplitude between 24 and 70 I.R.E., peak-to-peak. This enables full utilization of the video channel, thereby maximizing the immunity of the system to noise.

The four distinct states of the modulated subcarrier signal produced by the mixer 31 are shown in Table II and in the state diagram of FIG. 2. It will be observed that the subcarrier can have a phase angle that is either 0° or 180° and an amplitude that is either relatively arge or relatively small, depending on the particular states of the original data bits C and D.

The specially-formatted composite signal to be recorded on the video disc 11 is produced by a summing circuit 41, which sums together the filtered four-level signal output by the first low-pass filter 25 on line 43, the modulated subcarrier signal output by the mixer 31 on line 45 and the video synchronizing signals supplied on line 17. The frequency spectrum of this composite signal is shown in FIG. 3. The component extending between zero and 1.7 MHz is the first four-level signal, and the component extending between 1.9 and 5.3 MHz corresponds to the modulated subcarrier. It will be appreciated that this spectrum corresponds generally to that of a conventional color video signal, the baseband component corresponding to a luminance signal and the subcarrier component corresponding to a chrominance signal.

The composite signal produced by the summing circuit 41 is recorded on the video disc 11 in a conventional fashion using a frequency modulator 47, a laser 49, and an intensity modulator 51. The composite signal is first transmitted over line 53 from the summing circuit to the frequency modulator, which frequency modulates a carrier, accordingly. The modulated carrier is transmitted over line 55 to the intensity modulator, which correspondingly modulates the intensity of a writing beam of light 57 produced by the laser. The modulated beam is then directed onto the disc, as the disc is rotated in a prescribed fashion, to record a succession of spaced pits representative of the frequency modulated signal. A more detailed description of suitable recording apparatus is provided in U.S. Pat. No. 4,225,873 to J. S. Winslow entitled "Recording and Playback System".

FIG. 4 shows apparatus for recovering the specially-formatted composite signal recorded on the video disc 11 by the apparatus of FIG. 1, and for converting the recovered signal back to its original format, i.e., a succession of four-bit digital words. The apparatus operates to scan the disc with a reading beam of light (not shown) to produce a reflected beam 59 that is modulated in intensity in accordance with the recorded information. In a conventional fashion, the reflected beam is detected and amplified by a photodetector and preamplifier 61, and the amplified signal is coupled over line 63 to a frequency discriminator 65, which demodulates the frequency-modulated signal to yield the special composite signal.

The apparatus of FIG. 4 further includes a 5.3 MHz low-pass filter 67, a 1.7 MHz low-pass filter 69, and a 1.9 MHz high-pass filter 71. The demodulated composite signal is coupled over line 73 from the discriminator 65 to the 5.3 MHz low-pass filter, which then provides a filtered composite signal for coupling over line 75 to both the 1.7 MHz low-pass filter and the 1.9 MHz high-pass filter. The 1.7 MHz low-pass filter separates the baseband component from the filtered composite signal, which corresponds to the first four-level signal produced by the first D/A converter 19 in the apparatus of FIG. 1. The 1.9 MHz high-pass filter separates the modulated subcarrier component from the composite signal, which corresponds to the phase and amplitude modulated subcarrier output by the mixer 31 in the apparatus of FIG. 1.

A multiplier or mixer 77 and a conventional video processing circuitry 79 are provided to demodulate the modulated subcarrier output by the 1.9 MHz high-pass filter 71. In particular, the video processing circuit monitors the successive chrominance bursts in the composite signal supplied on line 73 from the discriminator 65, and provides a 3.58 MHz reference signal having the same frequency as the modulated subcarrier and having a fixed phase angle. This reference signal, and the modulated subcarrier separated by the high-pass filter are transmitted over lines 81 and 83, respectively, to the mixer, which demodulates the subcarrier to a baseband signal. This baseband signal corresponds to the second four-level signal originally produced by the second D/A converter 21 in the apparatus of FIG. 1. The mixer includes a low-pass filter (not shwon) for eliminating a 2× frequency component produced in multiplying the modulated subcarrier by the reference signal.

The first four-level signal, extracted by the 1.7 MHz low-pass filter 69, and the second four-level signal, derived by the mixer 77, are coupled over lines 85 and 87 to first and second analog-to-digital (A/D converters 89 and 91, respectively. The two A/D converters in turn, provide the original data bits A-D, for output on lines 93a through 93d, respectively. The sequence of four-bit words originally output by the digital data source 13 in the apparatus of FIG. 1 is thereby re-created.

The apparatus of FIGS. 1 and 4 have particular utility when used to record both digital data and conventional video signals. An example of such a use is described in a copending and commonly-assigned application for U.S. Patent, Ser. No. 66,620, filed Aug. 15, 1979 in the name of W. R. Dakin and entitled "Video Recording Medium for Stop-Motion Playback", which is incorporated herein by reference. In the system disclosed in that application, a baseband digitized audio signal and a carrier signal frequency-modulated by a corresponding video signal are recorded on alternating tracks of a video disc, for use in stop-motion playback of a succession of video frames, with accompanying audio. The digitized audio signal and the frequency-modulated carrier have completely different formats and frequency spectra, so substantial separate circuitry is required to process the two signals for recording and playback. If that system were modified to utilize with the apparatus of the present invention, in which the digital information is placed in a special format similar to that of a conventional color video signal, substantial savings in circuitry could be realized.

Figure 5:
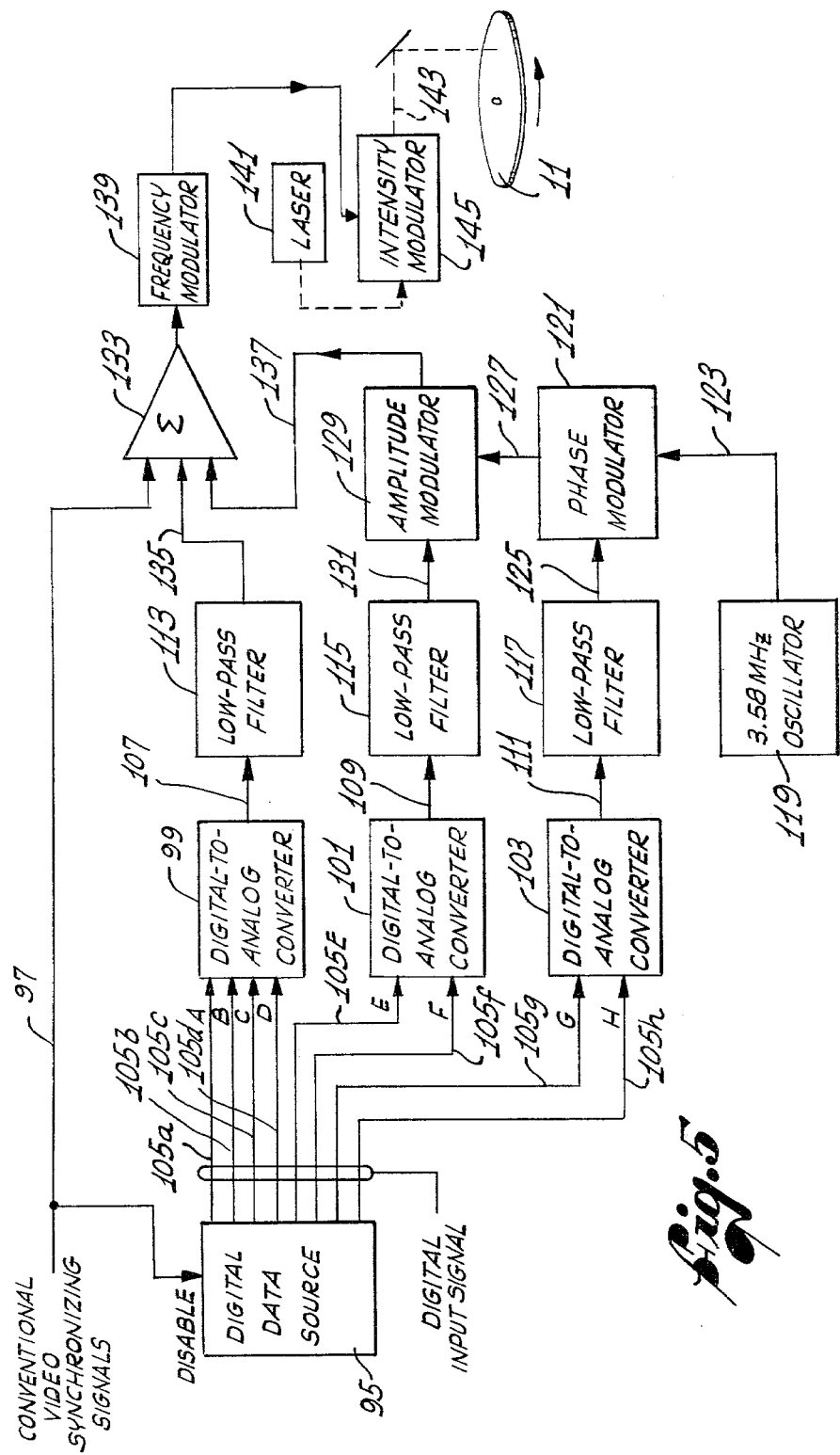
FIG. 5 is a simplified block diagram of an alternative embodiment of apparatus for formatting digital information and recording it on a video disc.

An alternative embodiment of apparatus for formatting digital information into the special video-like format for recording on a video disc 11 is shown in FIG. 5. Like the apparatus of FIG. 1, it formats a succession of multi-bit digital words into a baseband component and a modulated subcarrier component, and sums the two components to produce a composite signal for recording. In the apparatus of FIG. 5, however, each word includes eight bits. The baseband component has sixteen possible levels, and both the phase and the amplitude of the subcarrier component are modulated to one of four different values. This apparatus is particularly suitable for situations in which the signal is recorded with a higher signal-to-noise ratio, since there is a closer spacing, both in amplitude and phase, between the possible signal states of the composite signal recorded.

More particularly, the apparatus of FIG. 5 includes a digital data source 95, such as a digital memory, connected to output a succession of eight-bit digital words (bits A-H), except when disabled by conventional video synchronizing signals supplied on line 97. The successive eight-bit words are output at a rate of 3.6 MHz. The apparatus of FIG. 5 further includes first, second and third D/A converters 99 and 101 and 103, respectively, bits A through D being coupled on lines 105a through 105d to the first D/A converter, bits E and F being coupled on lines 105e and 105f to the second D/A converter, and bits G and H being coupled on lines 105g and 105h to the third D/A converter. Each D/A converter functions in a conventional fashion to convert its respective digital input signals to a corresponding multi-level output signal. The output of the first D/A converter has sixteen possible levels, whereas the outputs of the second and third D/A converters have four possible levels. The output signals produced by the three D/A converters 99, 101, and 103, are coupled over lines 107, 109, and 111 to first, second, and third low pass filters 113, 115, and 117, respectively, which limit the bandwidths of the respective signals to about 3.4 MHz.

The apparatus of FIG. 5 further includes an oscillator 119 for producing a 3.58 MHz subcarrier signal, and a phase modulator 121 for modulating the phase angle of the subcarrier signal in accordance with the filtered four-level signal output by the third low-pass filter 117. The subcarrier signal and the four-level signal are coupled to the phase modulator on lines 123 and 125, respectively. The phase modulator is preferably connected to produce a phase-modulated carrier having four possible phase angles separated from each other by exactly 90 degrees, to maximize the system's noise immunity.

The phase-modulated subcarrier is transmitted on line 127 from the phase modulator 121 to an amplitude modulator 129, for amplitude-modulating the subcarrier in accordance with the four-level signal supplied on line 131 from the second low-pass filter 115. The amplitude modulator can conveniently take the form of a conventional variable-gain amplifier. The amplitude of the subcarrier is preferably modulated to four discrete levels that are equally-spaced with respect to each other. A state diagram of the modulated subcarrier produced by the amplitude modulator is shown in FIG. 6.

The specially-formatted composite signal to be recorded is produced by a summing circuit 133, which sums together the video synchronizing signals supplied on line 97, the filtered sixteen-level baseband signal supplied on line 135 from the first low-pass filter 113, and the phase and amplitude modulated subcarrier supplied on line 137 from the amplitude modulator 129. Since the successive eight-bit words formatted by the apparatus of FIG. 5 are processed at a rate of 3.6 MHz, the spectra of the baseband signal and the modulated subcarrier signal overlap each other. Because of the nature of the video signal format, however, the respective spectra include discrete components that are interleaved with each other and the two signals can be subsequently separated.

The composite signal produced by the summing circuit 133 is recorded on the disc 11 in a conventional fashion using a frequency-modulator 139, a laser 141 for generating a writing beam of light 143, and an intensity modulator 145.

FIG. 7 depicts apparatus for recovering the specially-formatted composite signal recorded by the apparatus of FIG. 5, and for returning the signal to its original format, i.e., a sequence of eight-bit digital words. More particularly, the apparatus includes a photodetector and preamplifier 147 and a frequency discriminator 149, for recovering the recorded signal and demodulating it to produce a signal corresponding to the composite produced by the summing circuit 133 of FIG. 5.

The apparatus further incudes a low-pass filter 151, for passing just the bandwidth of the demodulated composite signal, a conventional comb filter 153 for extracting the phase/amplitudue-modulated subcarrier signal from the composite signal, and a subtracter circuit 155 for subtracting the extracted subcarrier signal from the composite signal to yield the 16-level baseband signal. In particular, the demodulated composite signal is transmitted on line 157 from the discriminator 149 to the low-pass filter, and in turn on line 159 to both the comb filter and the positive input terminal of the subtractor circuit. The extracted subcarrier signal is transmitted on line 161 from the comb filter to the negative input terminal of the subtracter circuit.

The comb filter 153, as contrasted with a mere high-pass filter, is required in order to extract the subcarrier signal because their respective frequency spectra of the baseband and subcarrier signal overlap each other. The frequency components of the modulated subcarrier are interleaved with those of the baseband component, however, and thus can be separated using the comb filter.

The apparatus of FIG. 7 further includes an amplitude demodulator 163, a video processing circuit 165 and an associated phase demodulator 167. The amplitude demodulator detects the amplitude of the modulated subcarrier supplied on line 161 from the comb filter 153, to re-create the four-level signal originally produced by the second D/A converter 101 in the apparatus of FIG. 5. The video processing circuit monitors the successive chrominance bursts in the demodulated composite signal output on line 157 by the frequency discriminator 149, and produces a 3.58 MHz reference signal having the same frequency as the modulated subcarrier and having a fixed phase angle. This reference signal and the modulated subcarrier are transmitted over lines 169 and 161 to the phase demodulator, which detects the phase angle of the subcarrier and re-creates the four level signal originally produced by the third D/A converter 103 in the apparatus of FIG. 5.

First, second, and third analog-to-digital (A/D) converters 171, 173, and 175, respectively, are provided to convert the three reconstructed multi-level signals to their original parallel digital format. The 16-level signal is transmitted on line 177 from the subtracter circuit 155 to the first A/D converter, to recreate the data bits A-D, for output on lines 179*a* through 179*d*, respectively. Similarly, the two four-level signals are transmitted on lines 181 and 183 from the amplitude demodulator 163 and the phase demodulator 167, respectively, to the respective second and third A/D converters, to re-create the data bits E-H, for output on lines 179*e* through 179*h*, respectively.

If the bandwidth of the composite signal recorded by the apparatus of FIG. 5 is limited to that of a standard color video signal, portions of the upper sideband of its modulated subcarrier component will be eliminated. In such case, apparatus for recovering the recorded composite signal must include vestigial sideband detection circuitry, as is conventional. Some loss in signal-to-noise ratio will of course result from such bandlimiting, but the bandlimited composite signal then could be transmitted over standard video channels.

From the foregoing description, it will be appreciated that the present invention provides an improved technique for converting digital data into a special format similar to that of a standard color video signal. The special format includes a multi-level baseband component corresponding to the luminance component of a conventional video signal, and a phase and/or amplitude-modulated subcarrier corresponding to the chrominance components of a video signal. This format is highly efficient and takes better advantage of high signal-to-noise ratio channels. Also, since the signal format is similar in many respects to that of a conventional color video signal, the special signal can be transmitted over standard video channels and conventional video circuitry can be used to process it.

Although the invention has been described in detail with reference to its presently preferred embodiments, it will be understood by those of ordinary skill in the art that various modifications can be made, without departing from the spirit and scope of the invention. Accordingly, it is not intended that the invention be limited, except as by the appended claims.

We claim:
1. A method of formatting digital information into a format similar to that of a color video signal, comprising steps of:
   converting the digital information into a first multi-level signal and a second multi-level signal, each signal having at least two signal states, and each level of said multi-level signals representing a corresponding arrangement of binary states of said digital information;
   providing a subcarrier having a prescribed frequency;

modulating the subcarrier in accordance with the second multi-level signal;

providing video synchronization signals; and summing together the first multi-level signal, the modulated subcarrier, and the synchronization signals, to produce a composite signal having a format similar to that of a color video signal.

2. A method as defined in claim 1, wherein the step of arranging includes steps of:

formatting the digital information into a succession of multi-bit words;

separating each of the successive multi-bit words into a first group of bits and a second group of bits, at least the first group including a plurality of bits; and converting the successive first groups of bits into the first multi-level signal.

3. A method as defined in claim 2, wherein:

the second group of bits in each of the successive multi-bit words produced in the step of separating includes a plurality of bits; and the step of arranging further includes a step of converting the successive second groups of bits into the second multi-level signal.

4. A method as defined in claim 3, wherein:

the differences between the successive levels in the first multi-level signal are substantially equal to each other; and the differences between the successive levels in the second multi-level signal are substantially equal to each other.

5. A method as defined in claim 3, wherein both the step of converting the successive first groups and the step of converting the successive second groups are performed according to a Gray code.

6. A method as defined in claim 1, wherein the step of modulating modulates the amplitude of the subcarrier in accordance with the second multi-level signal.

7. A method as defined in claim 1, wherein the step of modulating modulates the phase angle of the subcarrier in accordance with the second multi-level signal.

8. A method as defined in claim 1, wherein the step of modulating modulates the amplitude of the subcarrier in accordance with a first portion of the second multi-level signal and modulates the phase angle of the subcarrier in accordance with a second portion of the second multi-level signal.

9. A method as defined in claim 1, wherein the first multi-level signal and the second multi-level signal formed in the step of arranging have substantially the same bandwidth.

10. Apparatus for formatting digital information into a format similar to that of a color video signal, suitable for transmission over a standard video channel, the apparatus comprising:

signal source means for providing conventional video synchronizing signals;

first and second digital-to-analog converter means for converting the digital information into first and second multi-level baseband signals, respectively, each of said first and second multi-level baseband signals having at least two signal states, and each level of said multi-level signals representing a corresponding arrangement of binary states of said digital information;

means for modulating a subcarrier in accordance with the second multi-level signal; and means for summing together the first multi-level signal, the modulated subcarrier, and the video synchronizing signals, to produce a composite signal having a format similar to that of a color video signal, suitable for transmission over a standard video channel.

11. Apparatus as defined in claim 10, wherein the means for modulating modulates the amplitude of the subcarrier.

12. Apparatus as defined in claim 11, wherein the means for modulating modulates the amplitude of the subcarrier in accordance with a first portion of the second multi-level signal and the phase angle of the subcarrier in accordance with a second portion of the second multi-level signal.

13. Apparatus as defined in claim 10, wherein:

the differences between the successive levels in the first multi-level signal are substantially equal to each other; and the differences between the successive levels in the second multi-level signal are substantially equal to each other.

14. Apparatus as defined in claim 10, wherein the first and second multi-level signals have substantially the same bandwidth.

15. Apparatus as defined in claim 10, wherein:

the bandwidths of the first multi-level signal and the modulated subcarrier overlap each other; and the frequency spectra of the first multi-level signal and the modulated subcarrier include periodically-spaced, discrete components that are interleaved with each other.

16. Apparatus as defined in claim 10, wherein:

both the first multi-level signal and the second multi-level signal include more than two signal states; and both the first digital-to-analog converter and the second digital-to-analog converter perform conversions in accordance with a Gray code.

17. Apparatus for demodulating a composite signal carrying digital information and having a special format similar to that of a color video signal, the composite signal including a first multi-level signal, a subcarrier modulated in accordance with a second multi-level signal, and video synchronization signals, the apparatus comprising:

means for extracting the first multi-level signal from the composite signal;

means for converting the first multi-level signal into a corresponding first digital signal;

means for extracting the modulated subcarrier from the composite signal;

means for demodulating the extracted subcarrier to yield the second multi-level signal; and means for converting the second multi-level signal into a corresponding second digital signal;

wherein the first and second digital signals represent the digital information carried by the composite signal.

18. Apparatus as defined in claim 17, wherein:

the means for extracting the first multi-level signal is a low-pass filter; and the means for extracting the modulated subcarrier is a high-pass filter.

19. Apparatus as defined in claim 17, wherein the means for converting the first multi-level signal and the means for converting the second multi-level signal are both analog-to-digital converters.

20. Apparatus as defined in claim 17, wherein:

the amplitude of the modulated subcarrier signal is modulated in accordance with the second multi-level signal; and the means for demodulating includes means for detecting the amplitude of the modulated subcarrier.

21. Apparatus as defined in claim 20, wherein:

the phase angle of the subcarrier signal in the composite signal is modulated in accordance with a third multi-level signal;

the means for demodulating further includes means for demodulating the phase of the modulated subcarrier signal, to yield the third multi-level signal; and the apparatus further includes means for converting the third multi-level signal into a corresponding third digital signal, representative of a portion of the digital information carried by the composite signal.

22. A method of formatting digital information into a format similar to that of a conventional color video signal, comprising steps of:

formatting the digital information into a succession of multi-bit words;

separating each of the successive multi-bit words into a first group of bits and a second group of bits, each group including a plurality of bits;

converting the successive first groups of bits into a corresponding first multi-level, baseband signal;

converting the successive second groups of bits into a corresponding second multi-level, baseband signal;

wherein the differences between successive levels in the first multi-level signal are substantially equal to each other, and the differences between teh successive levels in the second multi-level signal are substantially equal to each other;

providing a subcarrier having a prescribed frequency;

modulating the amplitude of the subcarrier in accordance with a first portion of the second multi-level signal;

modulating the phase angle of the subcarrier in accordance with a second portion of the secnd multi-level signal;

providing video synchronization signals; and summing together the first multi-level signal, the modulated subcarrier, and the synchronization signals, to produce a composite signal having a format similar to that of a color video signal.

23. A method of formatting digital information into a format similar to that of a color video signal, comprising steps of:

formatting the digital information into a succession of multi-bit words;

separating each of the successive multi-bit words into a first group of bits and a second group of bits, at least the first group including a plurality of bits;

converting the successive first groups of bits into a first multi-level signal;

converting the successive second groups of bits into a second multi-level signal;

providing a subcarrier having a prescribed frequency;

modulating the subcarrier in accordance with the second multi-level signal;

providing video synchronization signals; and summing together the first multi-level signal, the modulated subcarrier, and the synchronization signals, to produce a composite signal having a format similar to that of a color video signal.

24. A method as defined in claim 23, wherein:

the second group of bits in each of the successive multi-bit words produced in the step of separating includes a plurality of bits.

25. A method as defined in claim 24, wherein:

the differences between the successive levels in the first multi-level signal are substantially equal to each other; and the differences between the successive levels in the second multi-level signal are substantially equal to each other.

26. A method as defined in claim 24, wherein both the step of converting the successive first groups and the step of converting the successive second groups are performed according to a Gray code.

27. Apparatus for formatting digital information into a format similar to that of a color video signal, suitable for transmission over a standard video channel, the apparatus comprising:

first digital-to-analog converter means for converting a first portion of the digital information into a first multi-level baseband signal of a first bandwidth;

second digital-to-analog converter means for converting a second portion of the digital information into a second multi-level baseband signal of a second bandwidth;

means for modulating a subcarrier in accordance with the second multi-level signal; and means for summing together the first multi-level signal, the modulated subcarrier, and video synchronizing signals, to produce a composite signal having a format similar to that of a color video signal, suitable for transmission over a standard video channel; and wherein:

the bandwidths of the first multi-level signal and the modulated subcarrier overlap each other; and the frequency spectra of the first multi-level signal and the modulated subcarrier include periodically-spaced, discrete components that are interleaved with each other.

* * * * *

UNITED STATES PATENT AND TRADEMARK OFFICE
CERTIFICATE OF CORRECTION

PATENT NO. : 4,347,619

DATED : August 31, 1982

INVENTOR(S) : Wayne R. Dakin & Jordan Isailovic

It is certified that error appears in the above-identified patent and that said Letters Patent are hereby corrected as shown below:

Claim 2, line 2, change "arranging" to --converting--.

Claim 3, line 5, change "arranging" to --converting--.

Signed and Sealed this

Fifth Day of November 1985

[SEAL]

Attest:

DONALD J. QUIGG

Attesting Officer

Commissioner of Patents and Trademarks